United States Patent [19]

Finley et al.

[11] Patent Number: 4,783,328

[45] Date of Patent: Nov. 8, 1988

[54] UTILIZATION OF PHOSPHOURUS CONTAINING BY-PRODUCTS

[75] Inventors: Joseph H. Finley, Metuchen; Richard E. Hall, Trenton, both of N.J.

[73] Assignee: FMC Corporation, Philadelphia, Pa.

[21] Appl. No.: 132,758

[22] Filed: Dec. 14, 1987

[51] Int. Cl.$^4$ .............................................. C01B 25/01
[52] U.S. Cl. ...................................................... 423/323
[58] Field of Search ........................................ 423/323

[56] References Cited

U.S. PATENT DOCUMENTS

| | | | |
|---|---|---|---|
| 1,534,828 | 4/1925 | Barr . | |
| 2,040,081 | 5/1936 | Curtis | 23/108 |
| 2,267,077 | 12/1941 | Burke | 423/323 |
| 2,776,828 | 1/1957 | Marcellus et al. | 263/53 |
| 3,032,408 | 5/1962 | Baumann | 71/64 |
| 3,345,443 | 10/1967 | Ziegler et al. | 264/117 |
| 3,364,008 | 1/1968 | Hollingsworth et al. | 71/41 |
| 3,773,473 | 11/1973 | Howard et al. | 23/293 R |
| 3,923,961 | 12/1975 | Dancy | 423/323 |
| 4,279,876 | 7/1981 | Schrodter et al. | 423/305 |
| 4,372,929 | 2/1983 | Barber | 423/323 |
| 4,373,893 | 2/1983 | Barber | 425/222 |
| 4,383,847 | 5/1983 | Barber | 71/34 |
| 4,421,521 | 12/1983 | Barber | 44/16 R |
| 4,451,277 | 5/1984 | Barber | 71/36 |
| 4,514,366 | 4/1985 | Barber | 423/318 |
| 4,537,615 | 8/1985 | Barber | 71/36 |
| 4,537,756 | 8/1985 | Rottgen et al. | 423/323 |
| 4,556,548 | 12/1985 | Gradl et al. | 423/321 S |
| 4,608,241 | 8/1986 | Barber | 423/317 |
| 4,619,819 | 10/1986 | Barber | 423/317 |
| 4,649,035 | 3/1987 | Barber | 423/317 |

FOREIGN PATENT DOCUMENTS

| | | | |
|---|---|---|---|
| 0131848 | 1/1985 | European Pat. Off. | 423/323 |
| 77155197 | 12/1977 | Japan | 423/323 |
| 649651 | 2/1979 | U.S.S.R. | 423/323 |
| 742376 | 6/1980 | U.S.S.R. | 423/323 |
| 823277 | 4/1981 | U.S.S.R. | 423/323 |
| 829557 | 5/1981 | U.S.S.R. | 423/323 |
| 1091816 | 11/1967 | United Kingdom | 423/323 |

OTHER PUBLICATIONS

Pashchenko, V. N., Olontesev, I. F., Lozhkin, A. F., Mamonov, O. V. (Perm. Politekh. Inst. Perm. (USSR), Izv. Vyssh. Uchebn. Zaved., Khim. Khim. Tekhnol. 1979, Physiocochemical Principles of the Preparation of a Granular Charge for Defluorination.

*Primary Examiner*—John Doll
*Assistant Examiner*—Wayne A. Langel
*Attorney, Agent, or Firm*—Robert D. Jackson; Frank Ianno

[57] ABSTRACT

Phosphorus values in the raffinate from wet acid purification and nodule fines from an electric phosphorus furnace are recovered as elemental phosphorus by forming briquettes with a bed of the raffinate and nodule fines, curing the briquettes and feeding the cured briquettes plus the requisite coke and silica fluxing agent into an electric phosphorus furnace.

9 Claims, No Drawings

UTILIZATION OF PHOSPHOURUS CONTAINING BY-PRODUCTS

This invention relates to the utilization of certain phosphorus containing by-products which are incidental to the manufacture of phosphorus and phosphoric acid.

In the electrothermal manufacture of elemental phosphorus, a feed stream of phosphatic material such as calcined phosphate ore, a carbonaceous reductant such as coke and optionally a fluxing agent such as silica are charged into an electric furnace. The charge materials undergo resistive heating which results in the formation of a molten reaction mass. Reduction of the phosphate ore to phosphorus produces a gaseous mixture of phosphorus vapor, carbon monoxide and particulates. After freeing of particulates, typically by electrostatic precipitation or cyclone separators, the gaseous stream is water quenched and the condensed phosphorus recovered and stored under water. The furnace is tapped periodically to remove molten slag and liquid ferrophosphorus.

In a typical method of preparing the phosphatic feed material, raw phosphate ore is first formed into aggregates or agglomerates of the requisite size by compacting comminuted phosphate ore with a binder to form shaped articles such as pellets or briquettes, usually the latter. These are then calcined to increase their crush strength and thereby minimize breakage. The procedure is much used in the processing of phosphate shales such as are found in the Western areas of the United States. These shales usually contain clay which undergo sintering during calcination thereby acting as a binder for the phosphate particles to give a high strength agglomerate.

Although the manufacture of phosphorus by reduction of phosphate ore in an electric furnace is an established industry, it is not entirely free of operational problems. For example, the briquettes of calcined phosphate shale are subject to varying degrees of abrasion during handling and while in transport to the furnace. As a consequence, a certain amount of calcined ore particulates are generated. Over extended periods of operation, these by-product fines, generally ¼ inch or smaller and referred to as nodule fines, accumulate in considerable amounts.

Fines build up can be ameliorated to some extent by blending a stream of recycle nodule fines with fresh shale ore. However, this approach tends to be self-defeating owing to the increased susceptibility to abrasion of shale agglomerates containing recovered nodule fines. Nodule fines, unlike raw phosphate shale, cannot be compacted into strong shapes. Calcining destroys the binding properties of the shale. Hence, the decrease in strength of phosphate aggregates or briquettes containing nodule fines.

An additional solids by-product formed in the electrothermal manufacture of phosphorus is what is known in the trade as burden or baghouse dust. This is extremely fine particulate matter which is formed by abrasion of the feed (nodules, coke and silica) and is collected. As the name suggests, burden dust is a fine powdery substance. It consists almost entirely of -100 mesh (USS Series Sieve) material. The major component is upwards of about 90% calcined phosphate ore plus a few percent of coke and silica.

Clearly, recycling does not provide the phosphorus art with a satisfactory technique for dealing with the nodule fines and burden dust by-products.

Another example of a phosphorus containing by-product is associated with the manufacture of phosphoric acid by the so-called wet process. In this process, phosphate rock is treated with an acid, such as sulfuric acid, which reacts with the ore with concomitant release of free phosphoric acid. The acidulated reaction mixture is freed of suspended solids, mostly insoluble calcium sulfate, formed as a reaction product and the clarified acid recovered. The resulting crude phosphoric acid, commonly known as green acid due to colored contaminants, is normally too impure except for use in the production of commercial fertilizers. In order to be suitable for use in foods or detergents, the green acid must be purified to remove heavy metals and other metal contaminants such as iron and aluminum.

One well known method of purifying crude wet acid process phosphoric acid is by solvent extraction. In this procedure, the crude aqueous acid is contacted with a normally liquid, relatively inert, water immiscible or partially water immiscible organic solvent capable of extracting the phosphoric acid. Example solvents are amyl alcohol or a trialkylphosphate such as tributylphosphate. The solvent solution of phosphoric acid is separated from the aqueous phase after which it is stripped with water or an aqueous salt solution to give purified phosphate values. In commercial practice, banks of countercurrent extractors are employed for the extraction and stripping steps with provisions for recycling of the solvent.

Solvent extraction of crude wet acid leaves an aqueous raffinate containing most of the metal impurities in addition to some residual phosphoric acid. This raffinate by-product is difficult to dispose of since the acid solution of dissolved metal contaminants, especially arsenic and lead, can be hazardous if released directly into the environment.

A process has now been discovered whereby the phosphorus containing by-products aforesaid can be utilized and at the same time effectively disposed of by converting the phosphate values therein to elemental phosphorus in an electric phosphorus furnace and the provision of such process constitutes the principal object and purpose of the invention.

Other objects and purposes will become manifest in the ensuing description.

Broadly speaking, the objects of the invention are realized by carrying out a series of steps commencing with forming a homogeneous mixture of the raffinate recovered from solvent purification of wet process phosphoric acid and the nodule fines recovered from the electrothermal production of phosphorus. Optionally, the mix may contain up to about 30% by weight of recovered baghouse dust. Proportions of raffinate and nodule fines are adjusted so as to give a mixture having a consistency whereby it can be compacted into shaped articles, such as pillow briquettes. When fabricated in this manner, the "green" briquettes are sufficiently resistant to crushing as to permit their being handled and transported to the curing stage of the electrothermal phosphorus plant. The green briquettes are then hardened by heating them to curing temperatures after which they are suitable for charging into the electric phosphorus furnace for reduction to elemental phosphorus.

Mixing of the raffinate and nodule fines is effected in the known manner of blending solids and liquids. A familiar and convenient device for such purpose is a pugmill. The mixture is compacted into the desired shape, preferably a pillow briquette. This is conveniently carried out using commercially available equipment such as a roll briquetting press.

Curing of the green briquettes is accomplished by heating them at temperatures of from about 100° C. to about 900° C. for periods of time ranging from about 0.75 hours to about three hours, preferably at about 200° C. for about one hour. It is believed that the nodule fines interact with the acidic raffinate to form a mass of indurated phosphate complexes and that this is responsible for the increase in mechanical strength and abrasion resistance of the cured briquettes. In commercial practice, the briquettes can be cured in kilns or on a traveling grate through which are passed hot gases. The so cured briquettes are then fed into the electric phosphorus furnace as a supplemental feed stream along with the requisite quantities of coke reductant and silica fluxing agent for conversion into elemental phosphorus. In an alternative procedure, the coke and silica may be added to the raffinate/nodule fines mixture to give a composite briquette.

Instead of forming the nodule fines into a separate charge, they may be blended with fresh phosphate shale along with sufficient raffinate to act as binder for the fines. The shale/nodule fines mixture can contain by weight up to about 20% of fines. Such mixtures should be calcined in the range of about 900° C. to 1200° C.

The raffinate by-product is suitable as initially recovered from wet acid solvent purification or it can be concentrated by evaporation to contain a higher $P_2O_5$ content. Raffinates having a $P_2O_5$ value of from about 27.6% to about 51.8% were found to be satisfactory in practicing the invention. A typical raffinate assay is: 15 to 30% $P_2O_5$; 20 to 25% $SO_4^{-2}$; 25 ppm Cl; 240 ppm Ca; 3200 ppm V; 1500 ppm Cr; 2.1% Fe and 220 ppm Cd. Because of the large amount of dissolved solids, the raffinate is highly viscous.

Since the concentration of $P_2O_5$ in the raffinate can vary, it is convenient to define the binder level in the compositions of the invention in terms of the $P_2O_5$ content present in the raffinate, namely, $$\% \text{ Binder} = \frac{(\text{gms. } P_2O_5 \text{ added with raffinate})100}{\text{nodule fines} + \text{burden dust} + \text{binder } P_2O_5}$$

It has also been found that the strength of the compacted shapes herein can be improved by addition of water to the blend of nodule fines and raffinate. The added water is over and above that in the recovered raffinate. The quantity of water that is effective depends on the binder level and the $P_2O_5$ concentration of the binder. Generally, improvement in briquette strength was obtained where the quantity of added water corresponds to about 9–10% of the combined weight of the nodule fines and burden dust.

Operation of the invention in conjunction with an existing phosphorus plant can be implemented without making any basic changes in the design or running of the plant. Some add-on features would, of course, be required such as a screen to recover the abraded fines from the calcined phosphate nodules. Installation of a collector to receive the fines and means for transporting them to a pugmill mixer for blending with phosphoric acid and phosphate shale would also be needed. After leaving the mixer, the homogeneous blend of phosphoric acid, shale and nodule fines is handled in the normal plant manner for producing compacted shapes of phosphate shale followed by calcination of the shapes to give the agglomerated phosphate furnace feed.

The invention is illustrated in further detail by the following test procedures and examples in which compositions are on a weight basis unless stated otherwise.

General Preparations and Test Procedures Piston Pellet Preparation—Cylindrical pellets (ca. 1.1×1.1 inch) were prepared in a Carver press from 35.0 gram samples of blends prepared from nodule fines ($-\frac{1}{4}$ inch), raffinate, burden baghouse dust and free water.

Curing Step—Green pellets or pillow briquettes were routinely cured at 200° C. for one hour in a laboratory oven.

Abradability Test—This test was used to compare the strength of cylindrical pellets prepared in the laboratory. Four pellets were weighed and placed in a six mesh screen (USS Series), equipped with a metal cover and receiving pan. This assembly was shaken in a Tyler Model RX 24 Portable Sieve Shaker for 20 minutes. The total quantity of material abraded from the pellets was determined by weighing and was calculated as a percentage of the original weight of the four pellets.

EXAMPLE 1

5% Binder Level

A mixture consisting of 70 parts by weight of nodule fines and 30% burden dust was combined with an "as is" raffinate containing 27.6% $P_2O_5$ and a quantity of water equivalent to 9.8% of the solids weight. Cylindrical pellets were prepared in the Carver Press at 4000 psi as described above and were tested for abradability in the green (uncured) state. Additional pellets were cured at 200° C. and tested for abradability. Green and cured pellets containing no binder were also prepared and tested. Results below show that use of the raffinate binder improves the mechanical strength of the agglomerates significantly.

| Binder (Raffinate) | % Abraded | |
| --- | --- | --- |
| $P_2O_5$ Level | Green | Cured |
| 0 | 100 | 100 |
| 5.0 | 0.8 | 27.6 |

EXAMPLE 2

11% Binder Level

The nodule fines/burden dust mixture cited in Example 1 was moisturized to contain 10% water. A raffinate concentrate containing 51.8% $P_2O_5$ was added in an amount sufficient to give an 11.1% binder level as defined above. Pellets were prepared as in Example 1. The green pellets were wet and tended to stick together and were not tested for green abradability. After curing, however, the pellets were very strong in that they abraded to the extent of only 1.5% in the 20 minute Abradability Test.

EXAMPLE 3

Effect of Furnace Temperatures

Pellets prepared and cured as described in Example 2 were heated to 1300° C. in a resistance furnace to determine if they would degrade into fines at temperatures prevailing in the phosphorus furnaces. After cooling, the pellets abraded to the extent of only 2.2%, indicating that they can withstand furnace temperatures and therefore constitute suitable furnace feed.

We claim:

1. A process of utilizing by-products containing phosphorus values from the nodule fines (calcined calcium phosphate) and wet acid raffinate by recovering phosphorus from said by-products in an electric phosphorus furnace comprising the steps of:
   (1) forming a homogeneous compactible blend of the nodule fines and raffinate;
   (2) compacting the blend into "green" shapes;
   (3) heating the "green" shapes to curing temperatures;
   (4) charging the cured shapes into the electric phosphorus furnace in the presence of sufficient coke reductant and fluxing agent to effect reduction of the phosphate values in said cured shapes to elemental phosphorus, and
   (5) recovering the phosphorus produced from the by-products along with the principal phosphorus output of the furnace.

2. The process of claim 1 wherein the "green" shapes are pillow briquettes.

3. The process of claim 1 wherein the nodule fines are mixed with burden dust to give mixtures containing up to 30% by weight of the burden dust.

4. The process of claim 1 wherein the raffinate contains from about 27.6% to about 51.8% $P_2O_5$.

5. The process of claim 1 wherein the percentage by weight of $P_2O_5$ from the raffinate in the blend is from about 9% to about 12%.

6. The process of claim 1 wherein curing temperatures are from about 100° C. to about 900° C.

7. The process of claim 6 wherein curing temperatures are about 200° C. for a period of one hour.

8. The process of claim 1 wherein the nodule fines are mixed with raw (uncalcined) shale to give a mixture containing by weight up to about 20% nodule fines.

9. The process of claim 1 wherein the nodule fines, raffinate, coke reductant and fluxing agent are combined and formed into shapes to give a composite feed stream.

* * * * *